(12) United States Patent
Sugimoto et al.

(10) Patent No.: US 6,779,611 B2
(45) Date of Patent: Aug. 24, 2004

(54) WALK-BEHIND WORKING MACHINE

(75) Inventors: Yasuhiro Sugimoto, Wako (JP); Hiroshi Sueshige, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/438,043

(22) Filed: May 14, 2003

(65) Prior Publication Data

US 2004/0007368 A1 Jan. 15, 2004

(30) Foreign Application Priority Data

Jul. 11, 2002 (JP) ........................................ 2002-203219

(51) Int. Cl.$^7$ .............................................. A01B 33/00
(52) U.S. Cl. .................. 172/42; 172/108; 172/123; 172/125; 172/118; 74/386; 74/650; 192/45; 192/48.92
(58) Field of Search .......................... 172/42, 107, 108, 172/103, 123, 125, 118, 119; 192/45, 51, 48.92; 74/411.5, 386, 417, 650

(56) References Cited

U.S. PATENT DOCUMENTS

| | | | | |
|---|---|---|---|---|
| 2,306,958 A | * | 12/1942 | Aladar ........................ | 74/386 |
| 4,226,316 A | * | 10/1980 | Geisthoff .................. | 192/56.57 |
| 4,317,511 A | * | 3/1982 | Asai ........................ | 192/56.57 |
| 4,567,949 A | * | 2/1986 | Herscher .................... | 172/42 |
| 4,640,366 A | * | 2/1987 | Saito .......................... | 172/42 |
| 4,832,542 A | * | 5/1989 | Johnson et al. ............. | 408/139 |
| 4,867,009 A | * | 9/1989 | Hudson ....................... | 74/650 |
| 4,895,210 A | * | 1/1990 | Witzel ........................ | 172/256 |
| 4,949,824 A | * | 8/1990 | Buckley et al. ............... | 192/45 |
| 5,142,943 A | * | 9/1992 | Hughes ....................... | 74/650 |
| 5,279,402 A | * | 1/1994 | Beigang ...................... | 192/57 |
| 5,713,420 A | * | 2/1998 | Roberts et al. ............... | 172/42 |
| 5,865,071 A | * | 2/1999 | Mimura ....................... | 74/650 |
| 5,901,791 A | * | 5/1999 | Ichikawa et al. ............. | 172/74 |
| 6,338,402 B1 | * | 1/2002 | Muramatsu et al. .......... | 192/45 |
| 6,435,325 B1 | * | 8/2002 | Miller et al. ................. | 192/45 |
| 6,488,101 B1 | * | 12/2002 | Miyahara et al. ............. | 172/46 |
| 6,540,031 B1 | * | 4/2003 | Sasaoka ....................... | 172/42 |
| 6,701,804 B2 | * | 3/2004 | Terada ......................... | 74/650 |
| 6,708,774 B2 | * | 3/2004 | Miyahara et al. ............. | 172/42 |

FOREIGN PATENT DOCUMENTS

| | | | |
|---|---|---|---|
| JP | 49021844 | | 6/1974 |
| JP | 63-297174 | * | 12/1988 |
| JP | 7009742 | | 3/1995 |
| JP | 2001-275401 | * | 10/2001 |

* cited by examiner

*Primary Examiner*—Victor Batson
(74) *Attorney, Agent, or Firm*—Adams & Wilks

(57) ABSTRACT

A walk-behind working machine includes a motive power source, right and left transmission shafts, and a clutch for transmitting motive power from the source to the shafts. The transmission shafts are disposed in alignment with their respective ends butting against each other. The clutch includes a driving cylindrical member rotationally mounted around the transmission shafts. The transmission shafts have first grooves formed on their outer peripheral surfaces while the cylindrical member has second grooves formed on an inner peripheral surface thereof. The clutch further includes balls disposed between a space defined by the first and second grooves. The first groove is of substantially V-shaped configuration. The first groove has a leading end positioned between the ends of the transmission shafts.

1 Claim, 9 Drawing Sheets

WALK-BEHIND WORKING MACHINE

FIELD OF THE INVENTION

The present invention relates generally to a walk-behind working machine including a drive source for producing a motive power, traveling portions, and a power transmission system for transmitting the motive power to the traveling portions so as to propel the machine, and in particular to an improvement in a clutch of the power transmission system.

BACKGROUND OF THE INVENTION

Walk-behind working machines include tillers, carts, and snow removing machines. Such working machines have drive sources for producing motive powers and are propelled by the motive powers. During propulsion of the working machine, operators walk behind and steer the working machines, holding operational handles of the machines. The machines also have traveling portions such as wheels and endless belts, and power transmission systems for transmitting the motive powers to the traveling portions. The power transmission systems include clutches. Operation of the clutches enables the machines to travel straight or make turns.

The walk-behind working machines are known from, for example, Japanese Utility Model Post-Exam Publication No. SHO 49-21844 entitled "TURNING DEVICE FOR MOVABLE AGRICULTURAL MACHINE" and Japanese Utility Model Post-Exam Publication No. HEI 7-9742 "CLUTCH MECHANISM".

The publication No. SHO 49-21844 discloses a walk-behind movable agricultural machine including dog clutches. The publication No. HEI 7-9742 discloses a walk-behind movable agricultural machine including a ball-type clutch as will be explained with reference to FIG. 9. The walk-behind machines as disclosed in the above two publications have clutch levers for switching the clutches between engaged and disengaged positions, as will be discussed below in detail.

FIG. 9 hereof shows in cross-section the clutch of the walk-behind working machine 100 of the publication No. HEI-7-9742.

The working machine 100 for doing agricultural work includes an engine (not shown), a transmission mechanism 101, right and left clutch members 103, 103 for turning the machine 100, and right and left axles 104, 104. The transmission mechanism 101 has a driven sprocket 102. The axles 104, 104 are disposed in alignment. Each axle 104 has one end having the sprocket 102 rotationally fitted thereto. The engine produces a motive power to be transmitted via the sprocket 102 and the clutch members 103, 103 to the axles 104, 104.

The axles 104, 104 each have a spline groove 105 formed at the one end thereof. The driven sprocket 102 includes a hub 106 having apertures 107, 107 formed to extend therethrough. The apertures 107, 107 communicate with the grooves 105, 105. The clutch members 103, 103 each have balls 108 and a clutch change member 109 for bringing the balls into and out of the grooves.

The machine 100 includes right and left operational handles positioned at a rear part thereof. The handles have the right and left clutch levers, respectively. Manipulating the clutch levers operates either one or both of the right and left clutch members 103, 103 such that the balls come into and out of the grooves.

More specifically, when an operator grips the right clutch lever, for example, the right clutch member 103 is placed in an OFF state where the balls of the right clutch member 103 come out of the grooves. This makes it possible to transmit the motive power from the engine only to the left axle 104. Therefore, the machine 100 turns right.

When in use, the working machine 100 usually travels on rough or lumpy surfaces. The operator should operate the clutch lever, holding the operational handles and taking into account how much roughness the surface has in order that the machine 100 is turned leaving a desired trail. The operator is required to have a skill or technique high enough to operate the clutch levers and hold the handles in a posture suitable for steering the machine 100. Such operations of the operational handles and the clutch levers of the working machine 100 require greater manpower or effort. To address this problem, the clutch of the working machine 100 needs to be improved. Further, the clutch members 103, 103 and the clutch levers have complicated construction. These problems with the working machine 100 are found in the machine of the publication No. SHO 49-21844 as well.

One may propose to provide a well-known differential gear mechanism between the axles 104, 104, instead of the clutch members 103, 103. The differential gear mechanism is complicated in construction, however. This would lead to increased cost of the working machine 100.

SUMMARY OF THE INVENTION

An object of the present invention is to provide a walk-behind working machine including a clutch simply constructed to enable an operator to turn the machine easily.

According to one aspect of the present invention, there is provided a walk-behind working machine comprising: a motive power source for producing a motive power; right and left transmission shafts having outer peripheral surfaces having first grooves formed thereon; and a clutch for transmitting the motive power from the drive source to the right and left transmission shafts; the right and left transmission shafts each having one end, the ends of the right and left transmission shafts having right and left butting surfaces formed thereat, the right and left butting surfaces butting against each other, such that the right and left transmission shafts are disposed in alignment; the clutch including: a cylindrical member rotationally mounted around the ends of the right and left transmission shafts, the cylindrical member having an inner peripheral surface having second grooves formed thereon; and balls each disposed within a space defined by the first groove and the second groove; the cylindrical member capable of rotating to thereby rotate the right and left transmission shafts by means of the balls; the first grooves each having a generally V-shaped configuration and being directed in the direction of rotation of the right and left transmission shafts, the first grooves each having a leading end positioned between the right and left butting surfaces, the first grooves of the generally V-shaped configuration each having a bottom surface and a wall surface continuous with the bottom surface, the bottom surface and the wall surface contacting the ball.

Each first groove of substantially V-shaped configuration includes a pair of half grooves provided on the right and left transmission shafts, respectively. Each half groove has a side surface.

Transmission of the motive power rotates the cylindrical member. Rotation of the cylindrical member causes the transmission shafts to rotate in such a direction as to propel the working machine. The working machine includes a pair of operational handles used for turning the working machine. When the working machine is turned towards either of right and left sides, one of the handles positioned oppositely from the side of the tiller towards which the tiller is to be turned is pushed more strongly than the other handle. This causes the transmission shaft corresponding to the one handle to rotate relative to the transmission shaft corresponding to the other handle. The half groove of the transmission shaft corresponding to the one handle is shifted in the direction of rotation of the transmission shaft. At this moment, the side surface of the half groove of the transmission shaft corresponding to the one handle becomes out of contact with the ball.

Each ball then rolls into the half groove of the transmission shaft corresponding to the one handle. Consequently, the ball pushes only the side surface of the half groove of the transmission shaft corresponding to the one handle. Therefore, the transmission shaft corresponding to the one handle keeps rotating while the transmission shaft corresponding to the other handle stops rotating. This enables the working machine to turn towards the one side.

Turning the working machine readily and rapidly requires only an easy operation of pushing the one handle more strongly than the other handle. In other words, there is no need to provide the working machine with additional clutch levers which would otherwise be operated to turn the working machine. It thus becomes possible to facilitate the operation for turning the working machine. The thus arranged working machine can be propelled straight or turned reliably.

Provision of the clutch made up by the cylindrical member and the balls helps reduce the number of components of the working machine. In addition, the thus arranged working machine is rendered simple in construction. The clutch is cheap to thereby reduce a cost for the working machine.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENTS

Figure 1:
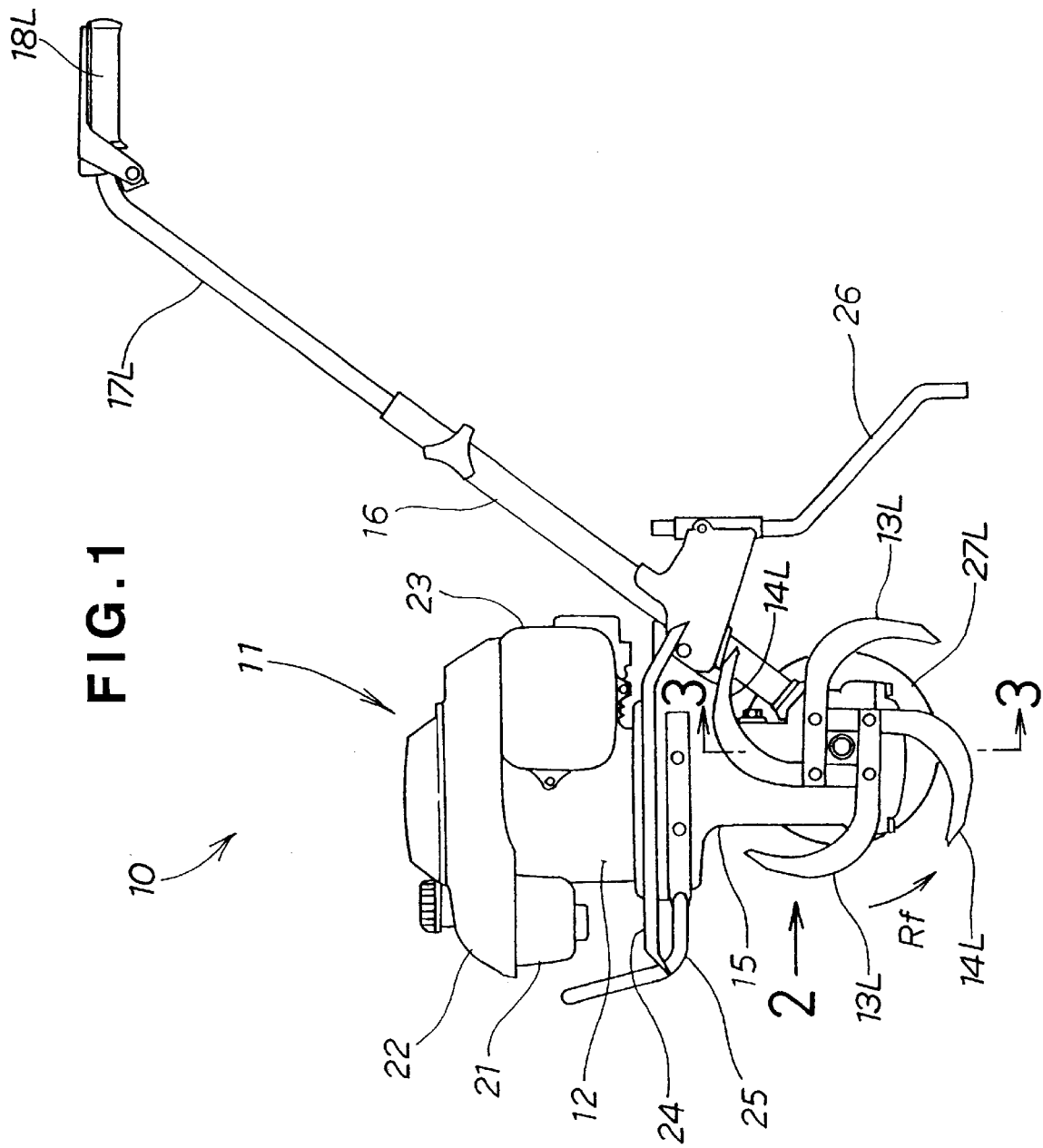
FIG. 1 is a side elevation view of a tiller as exemplary one of a walk-behind working machine or a tiller according to the present invention.

Referring to FIG. 1, exemplary one of a walk-behind working machine, that is, a tiller 10 includes a tiller body 11, and right and left plural tillage tines 13R, 13L, 14R, 14L. The body 11 includes a motive power source or an engine 12 for producing a motive power, a gear case 15 attached to a lower part of the engine 12 for the purpose of transmitting the motive power to the tillage tines 13R, 13L, 14R, 14L, a handle post 16 extending obliquely, upwardly and backwardly from a rear part of the gear case 15, and right and left operational rods 17R, 17L (only left one shown) mounted to an upper part of the handle post 16. The rods 17R, 17L have right and left grips (or right and left handles) 18R, 18L attached thereto.

The tiller 10 is of small-sized, self-propelled and often called "front-tine-type tiller". More specifically, the tillage tines 13R, 13L, 14R, 14L, when supplied with the motive power, propel the body 11 of tiller 10 while performing tilling operation. During propulsion of the tiller, an operator (not shown) walks behind and steers the tiller 10, holding the grips 18R, 18L.

The engine 12 serving as a motive power source has an output shaft extending vertically and downwardly. Reference numerals 21, 22, 23, 24, 25, 26, 27R (see FIG. 2), 27L denote a fuel tank, an engine cover, an air cleaner, a cover, a tiller body guard member, a skid, and right and left side discs, respectively. The cover 24 is arranged to prevent earth and sand having undergone the tilling operation from being scattered.

Figure 2:
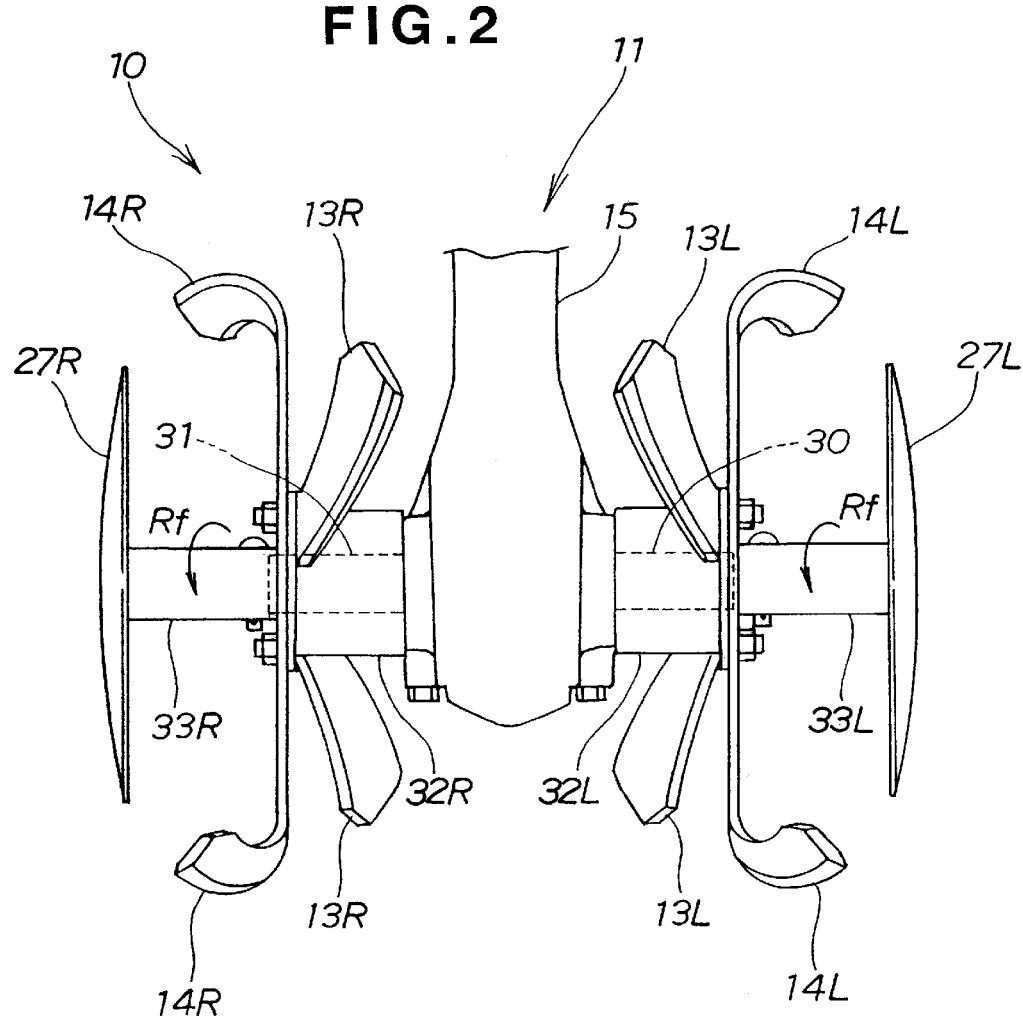
FIG. 2 is a view showing a lower part of the tiller including right and left tillage tines as viewed in a direction of arrow 2.

Turning to FIG. 2, the gear case 15 is positioned centrally of the tiller body 11. The gear case 15 has right and left tillage shafts 31, 30 extending horizontally and laterally from opposite side ends thereof. The gear case 15 has right and left brackets 32R, 32L mounted on the opposite side ends thereof. By means of the bracket 32R, the tillage tines 13R, 14R are mounted on the shaft 31. The tillage tines 13L, 14L are mounted on the shaft 30 through the bracket 32L. The right bracket 32R has a right shaft portion 33R attached to one end thereof. Likewise, the left bracket 32L has a left shaft portion 33L attached to one end thereof. The right and left shaft portions 33R, 33L include the right and left side discs 27R, 27L, respectively.

It will be noted that the right tillage shaft 31 transmits the motive power of the engine 12 to the right side disc 27R while the left tillage shaft 30 transmits the motive power of the engine 12 to the left side disc 27L. For the purpose of a better understanding, the right and left tillage shafts 31, 30 are hereinafter referred to as "right and left transmission shafts 31, 30".

Figure 3:
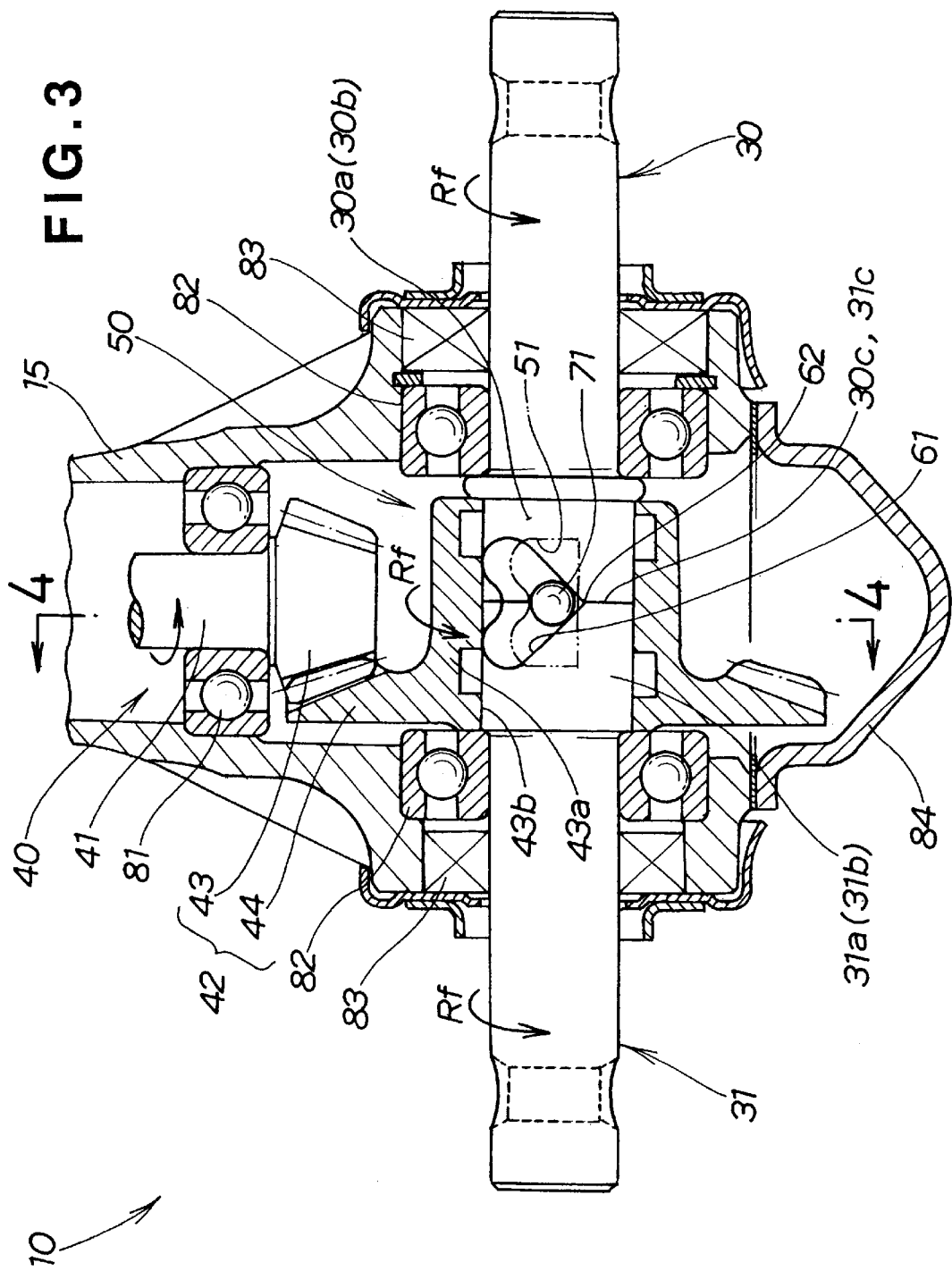
FIG. 3 is a cross-sectional view taken along line 3—3 of FIG. 1 showing right and left transmission shafts, and a power transmission mechanism including a bevel gear mechanism and a clutch.

As shown in FIG. 3, the gear case 15 has a power transmission mechanism 40 disposed therewithin. The mechanism 40 includes a connection shaft 41 connected to and extending downwardly from the output shaft of the engine 12, a bevel gear mechanism 42 mounted to the connection shaft 41, and a clutch 50 integral with the bevel gear mechanism 42. Through the mechanism 42 and the clutch 50, the connection shaft 41 is connected to the right and left transmission shafts 31, 30. The connection shaft 41, the bevel gear mechanism 42, and the clutch 50 are all housed in the gear case 15. The right transmission shaft 31 has one end 31a housed in the gear case 15. Similarly, the left transmission shaft 30 has one end 30a housed in the gear case 15.

The one end 31a of the right transmission shaft 31 has a butting surface 31c formed thereat while the one end 30a of the left transmission shaft 30 has a butting surface 30c formed thereat. The right and left transmission shafts 31, 30 are disposed in alignment with their butting surfaces 31c, 30c butting against each other.

The bevel gear mechanism 42 includes a driving bevel gear 43 formed integrally with the connection shaft 41, and a driven bevel gear 44 meshing with the driving bevel gear 43. The driven bevel gear 44 is rotationally mounted on the right and left transmission shafts 31, 30. In other words, the gear 44 is rotatable relative to the right and left transmission shafts 31, 30. The gear 44 is unmovable axially of the transmission shafts 31, 30.

The bevel gear 44 has a hub 43a. The hub 43a serves as a driving cylindrical member 43a of the clutch 50 as will be discussed below.

The clutch 50 includes the driving cylindrical member (hub) 43a rotationally mounted around the ends 31a, 30a of the transmission shafts 31, 30. The cylindrical member 43a has ball retaining grooves 51 (only one shown in FIG. 3) formed on an inner peripheral surface 43b thereof, as will be described in detail later. The right and left transmission shafts 31, 30 have engagement grooves 61 (only one shown in FIG. 3) formed on outer peripheral surfaces 31b, 30b thereof, as will be described in detail later. The clutch 50 further includes balls 71 (only one shown in FIG. 3) each disposed within a space S (see FIG. 4) defined jointly by the groove 51 and the groove 61. For the purpose of explanation, the engagement groove 61 is hereinafter referred to as "first groove portion" while the ball retaining groove 51 is hereinafter referred to as "second groove portion". As is apparent from FIG. 3, more specifically, the ends 31a, 30a have the first groove portions 61 formed on outer peripheral surfaces thereof.

The right and left transmission shafts 31, 30 have the same diameter at least at their ends 31a, 30a. Reference numerals 81, 82 designate bearings. Reference numerals 83, 84 denote an oil seal and a lid, respectively.

Figure 4:
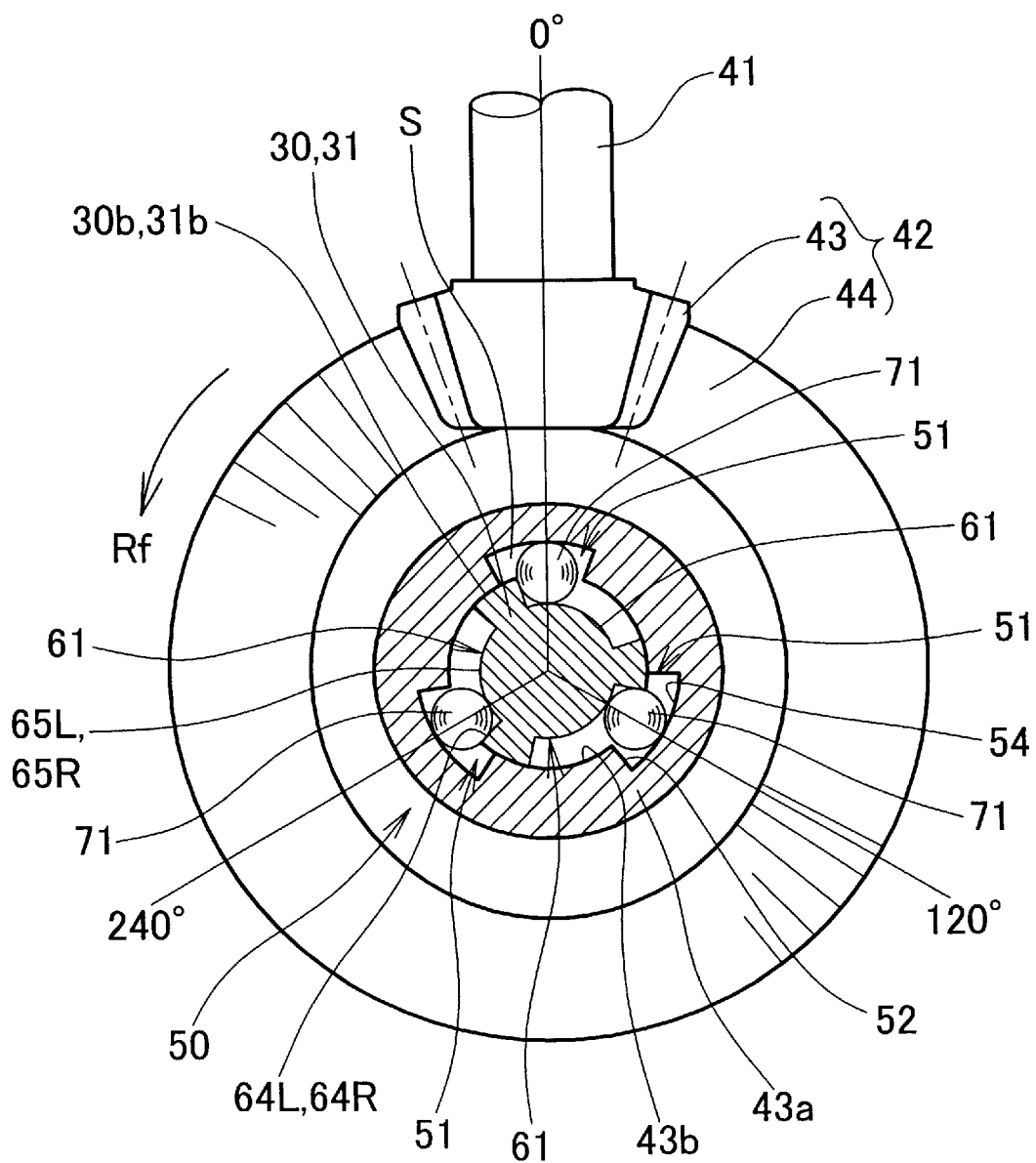
FIG. 4 is a cross-sectional view taken along line 4—4 of FIG. 3 showing the transmission shafts, the clutch, and the bevel gear mechanism.
Figure 5A:
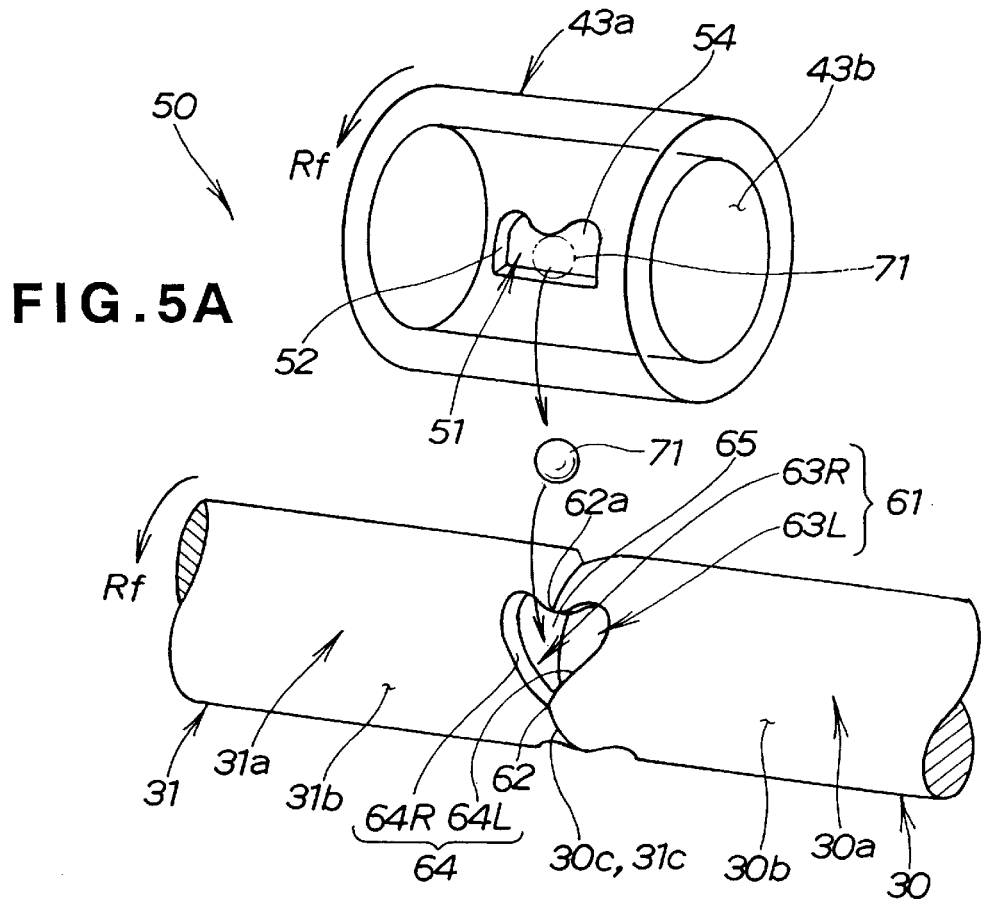
FIG. 5A is a perspective view showing the transmission shafts and a cylindrical member of the clutch separately and FIG. 5B is a perspective view showing the right and left transmission shafts separated from each other.
Figure 5B:
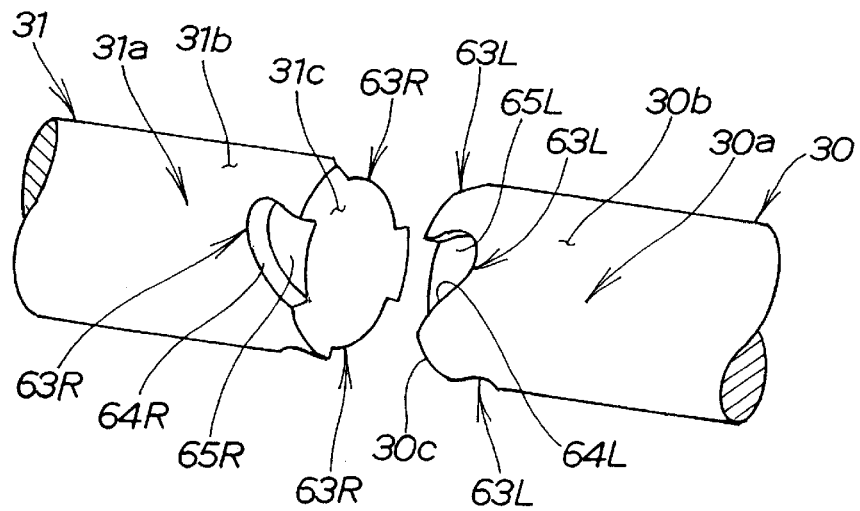

With respect to FIG. 4, FIG. 5A and FIG. 5B, the first groove portions 61 are disposed circumferentially of the outer peripheral surfaces of the ends 31a, 30a of the transmission shafts 31, 30 and spaced at intervals of 120 degrees. Likewise, the second groove portions 51 are disposed circumferentially of the inner peripheral surface 43b of the cylindrical member 43a and spaced at intervals of 120 degrees. Each first groove portion 61 includes right and left half grooves 63R, 63L. The right half groove 63R is formed on the outer peripheral surface of the one end 31a while the left half groove 63L is formed on the outer peripheral surface of the one end 30a. The right half grooves 63R are disposed circumferentially of the outer peripheral surface of the one end 31a and spaced from each other by 120 degrees while the left half grooves 63L are disposed circumferentially of the outer surface of the one end 30b and spaced from each other by 120 degrees. The first groove portion 61 includes a bottom wall surface (bottom surface) 65 and a side wall surface (wall surface) 64 continuous with the surface 65. More specifically, the bottom wall surface 65 includes right and left bottom wall surface portions 65R, 65L while the side wall surface 64 includes right and left side wall surface portions 64R, 64L. The right half groove 63R includes the right bottom wall surface portion 65R and the right side wall surface portion 64R continuous with the surface portion 65R. The surface portion 64R is substantially perpendicular to the surface portion 65R, as shown in FIG. 4. The left half groove 63L includes the left bottom wall surface portion 65L and the left side wall surface portion 64L continuous with the surface portion 65L. The surface portion 64L is substantially perpendicular to the surface portion 65L, as shown in FIG. 4. The second groove portion 51 includes a bottom wall surface 54 extending in substantially parallel to a longitudinal direction of the cylindrical member 43a, and a side wall surface 52 continuous with the surface 54. The surface 52 is substantially perpendicular to the surface 54, as shown in FIG. 4. The bottom wall surface 54 and the pair of right and left bottom wall surface portions 65R, 65L cooperate with each other to retain the ball 71 therebetween.

For the purpose of illustration, FIG. 5A shows respective ones of the first groove portion, the second groove portion, and the ball. FIG. 5B shows the ends 31a, 30a separated from each other.

The first groove portion 61 is of generally V-shaped configuration. The V-shaped first groove portion 61 has a leading end 62 and a trailing end 62a both positioned between the butting surfaces 31c, 30c. The groove portion 61 is oriented in the direction Rf of rotation of the transmission shafts 31, 30. The side wall surface portions 64R, 64L and the bottom wall surface portions 65R, 65L are all disposed in contact with the ball 71.

Figure 6A:
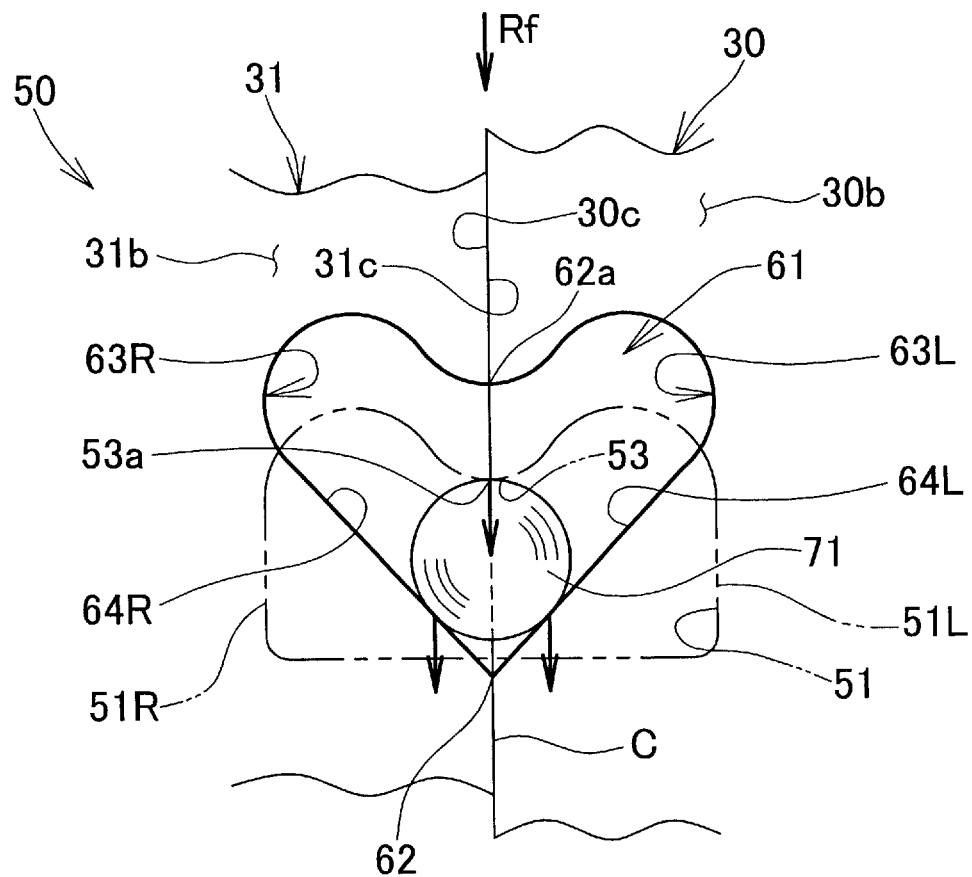
FIG. 6A is a view showing a ball, a first groove portion (shown by a solid line) formed on the transmission shafts and a second groove portion (shown by a double dot-and-dash line) formed on the cylindrical member.
Figure 6B:
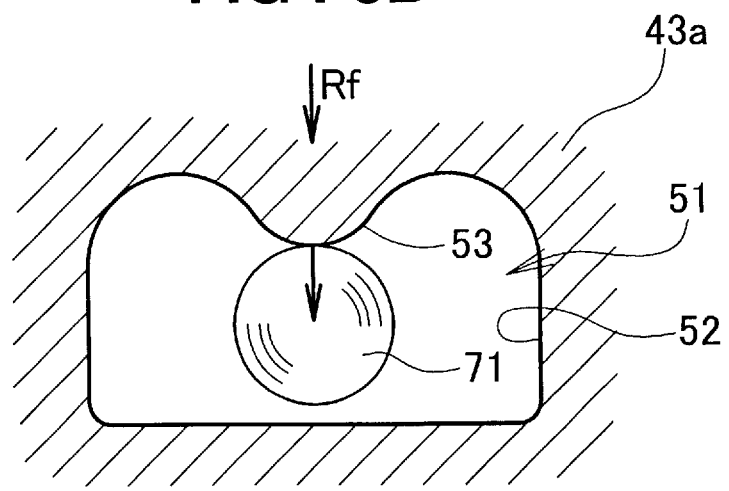
FIG. 6B is the view of FIG. 6A with the first groove portion omitted.

Reference is made to FIG. 6A and FIG. 6B.

FIG. 6A shows on an enlarged scale the first and second groove portions 61, 51 and the ball 71 of FIG. 3. FIG. 6B is the view of FIG. 6A with the first groove portion 61 omitted.

The right and left transmission shafts 31, 30 butt against each other with the side wall surface portions 64R, 64L meeting at the leading end 62 and the trailing end 62a to thereby provide a generally heart-shaped configuration drawn on a playing card. In other words, the right and left half grooves 63R, 63L are in a symmetric relation to each other. The right half groove 63R is formed on the one end 31a of the right transmission shaft 31 while the left half groove 63L is formed on the one end 30a of the left transmission shaft 30.

The side wall surface portion 64R meets the butting surface 31c whilst the side wall surface portion 64L meets the butting surface 30c. As can be seen from FIG. 4, the bottom wall surface portion 65R convexly extends in a circumferential direction of the right transmission shaft 31, taking the form of an arc of a circle having the same center as the transmission shaft 31, as best shown in FIG. 4. Similarly, the bottom wall surface portion 65L convexly extends in a circumferential direction of the left transmission shaft 30, taking the form of an arc of a circle having the same center as the transmission shaft 30.

The second groove portion 51 is elongated longitudinally of the cylindrical member 43a to provide a generally rectangular configuration, as shown in FIG. 6A and FIG. 6B. The second groove portion 51 has its length substantially equal to the width of the first groove portion 61. The second groove portion 51 includes right and left half portions 51R, 51L. The portions 51R, 51L are disposed in symmetric relation to each other with a central plane C positioned midway therebetween. It will be understood that the central plane C is defined between the butting surfaces 30c, 31c. The leading end 62 and the trailing end 62a are positioned on the plane C, as shown in FIG. 6A.

As shown in FIG. 6B, the side wall surface 52 has a projecting or convexly bulged surface 53. More specifically, the surface 53 projects in the direction Rf and is disposed to push or force the ball 71 to rotate the transmission shafts 30, 31 in the direction Rf. It is to be noted that, when the transmission shafts 30, 31 rotate in the direction Rf, the tiller 10 is propelled or traveled forwardly. The surface 53 has its distal end 53a lying in the plane C.

When the cylindrical member 43a rotates in the direction Rf, each projecting surface 53 pushes the ball 71 in the direction Rf. Each ball 71 then pushes the side wall surface portions 64R, 64L each inclined relative to the central plane C. This rotates the right and left transmission shafts 31, 30.

Operation of the clutch 50 will be discussed in relation to FIGS. 7A and 7B and FIGS. 8A to 8C.

Figure 7A:
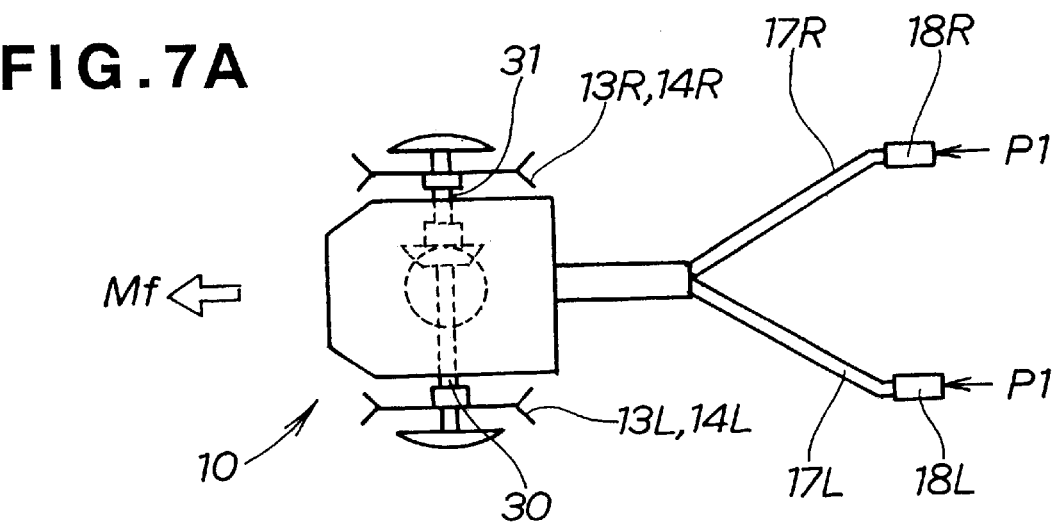
FIG. 7A is a plan view of the tiller having right and left grips subjected to forces having the same magnitude and FIG. 7B is a perspective view of the right and left transmission shafts of the tiller as shown in FIG. 7A.
Figure 7B:
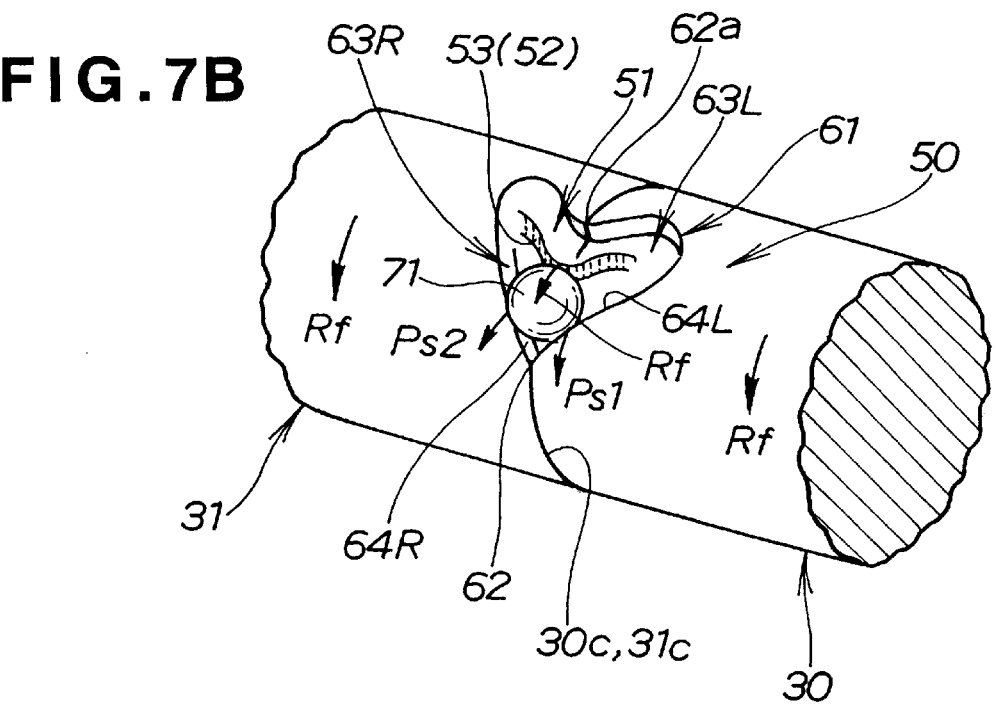

When the tiller 10 is traveled in a forward direction Mf with the grips 18R, 18L of the operational rods 17R, 17L pushed by forces P1, P1, respectively, the right and left half grooves 63R, 63L are "in phase". When the grooves 63R, 63L are "in phase", it means that the sidewall surface portions 64R, 64L are continuous with each other to provide the first groove portion 61 with the generally heart-shaped configuration of a playing card, as shown in FIG. 7B.

The direction Mf corresponds to the direction Rf. The cylindrical member 43a is caused to rotate by the motive power from the engine 12. This causes each side wall surface 52, that is, projecting surface 53 to push the ball 71 in the direction Rf. Therefore, each ball 71 pushes the side wall surface portions 64R, 64L in the direction Rf. At this time, the ball 71 exerts pushing forces Ps2, Ps1 on the side wall surface portions 64R, 64L, respectively. Because the right and left half grooves 63R, 63L are in phase as stated above, the forces Ps2, Ps1 are the same in magnitude as well as direction. In other words, the motive power of the engine 12 is transmitted or distributed substantially evenly to the right and left transmission shafts 31, 30. The right and left transmission shafts 31, 30 having the surface portions 64R, 64L thus pushed are rotated in the direction Rf at substantially the same rotational speed to thereby move the tiller 10 straight in the forward direction Mf as well as to make the tines 13R, 13L, 14R, 14L perform the tilling operation.

Figure 8A:
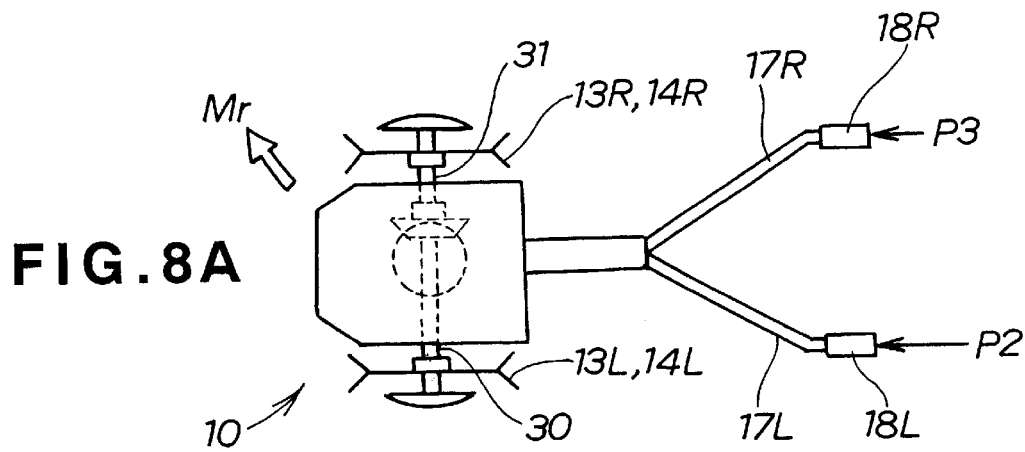
FIG. 8A is a plan view of the tiller having the right and left grips subjected to forces different in magnitude from each other.

When the tiller 10 is turned towards one of right and left sides, the tillage tines positioned on the one side of the tiller body 11 towards which the tiller 10 is to be turned turn more sharply than those on the other side. The operational rod positioned on the one side is referred to as an inside turning rod. Similarly, the operational rod positioned on the other side is referred to as outside turning rod. Referring to FIG. 8A, the outside turning rod is designated at 17L while the inside turning rod is designated 17R because the tiller 10 is to be turned in the right direction Mr.

In FIG. 8A, the grip 18L of the outside turning rod 17L is pushed more strongly than the grip 18R of the inside turning rod 17R. Namely, the grip 18L of the operational rod 17L is pushed with a pushing force P2 while the grip 18R of the operational rod 17R is pushed with a pushing force P3. The force P2 is greater in magnitude than the force P3. The force P3 is zero in magnitude, for example.

In correspondence to a difference in magnitude between the forces P2, P3, the left tillage tines 13L, 14L rotate at a higher speed than the right tillage tines 13R, 14R. This means that the left transmission shaft 30 rotates at a higher speed than the right transmission shaft 31. Consequently, there is made a difference in speed between the transmission shafts 30, 31. This allows the left transmission shaft 30 to rotate relative to the right transmission shaft 31, as shown by an arrow De of FIG. 8B.

Figure 8B:
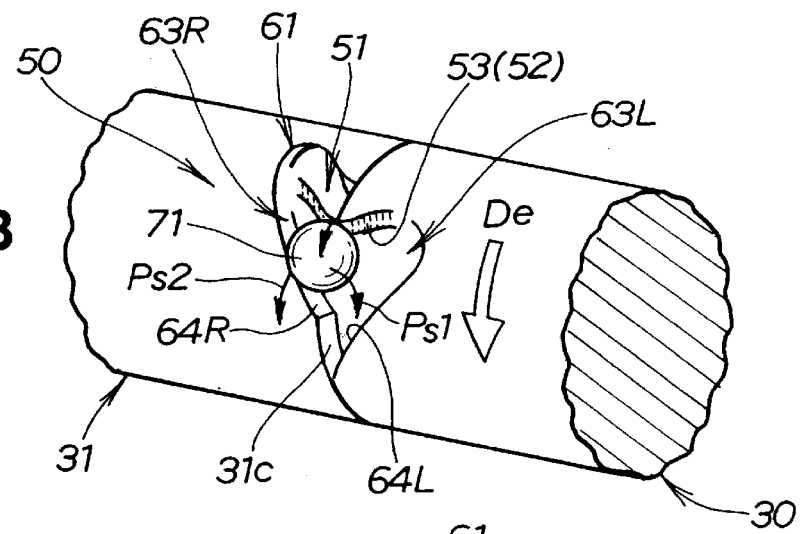
FIG. 8B is a perspective view showing the right transmission shaft and the left transmission shaft rotated relative to the right transmission shaft.
Figure 8C:
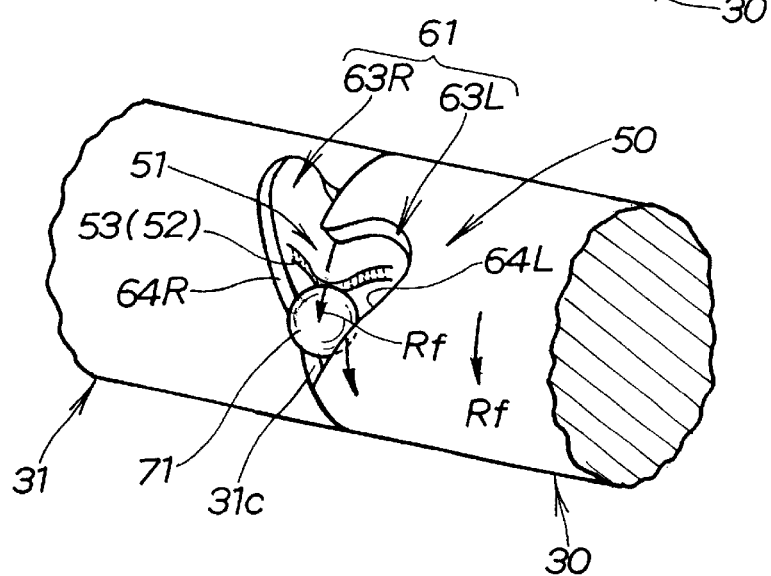
FIG. 8C is the view of FIG. 8B with the ball displaced.
Figure 9:
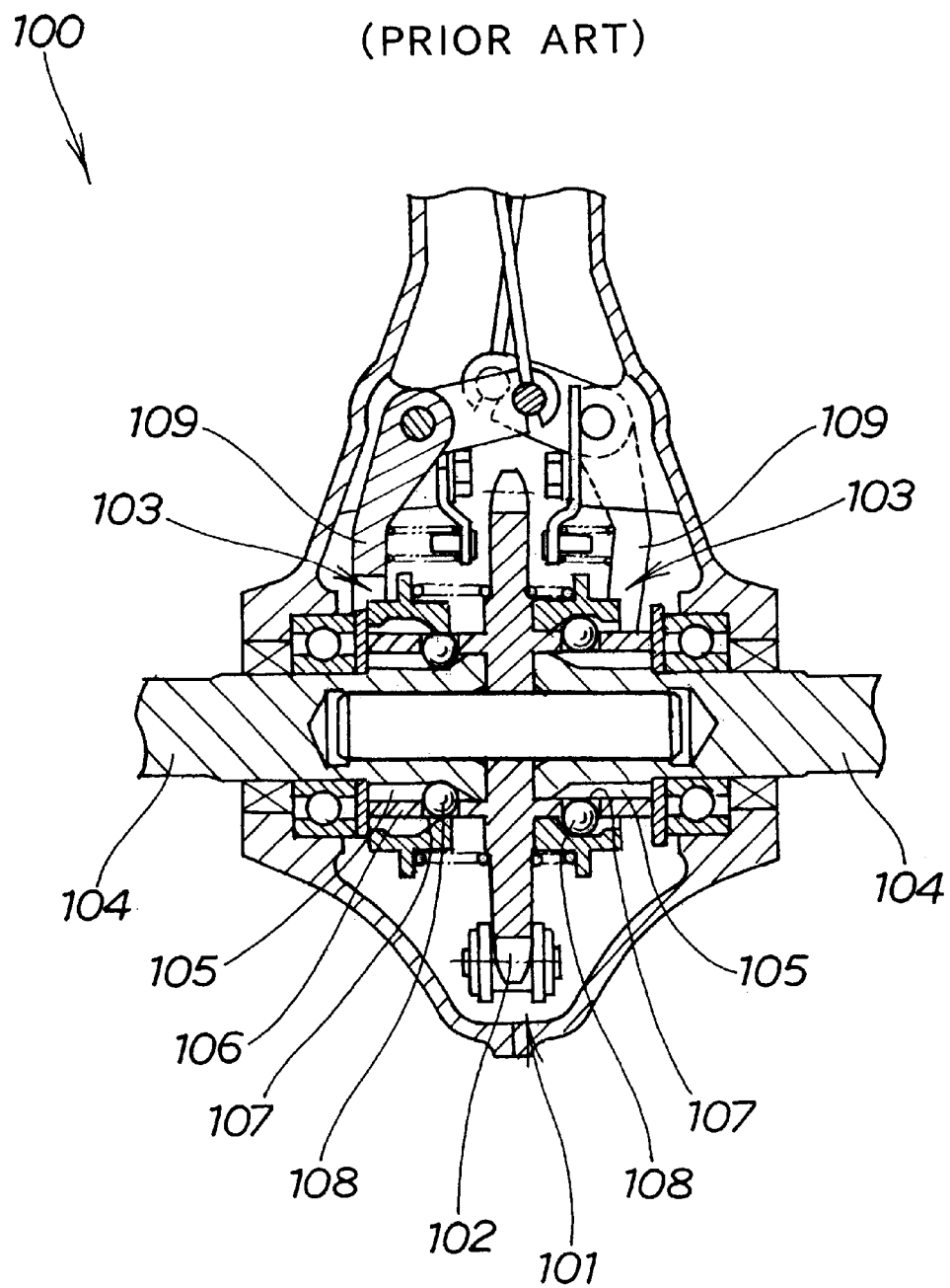
FIG. 9 is a cross-sectional view of a clutch of a conventional walk-behind working machine.

Rotation of the transmission shaft 30 relative to the transmission shaft 31 displaces the left half groove 63L "out of phase" with the right half groove 63R. When the left half groove 63L is "out of phase" with the right half groove 63R, it is meant that the side wall surface portion 64L is not continuous with the side wall surface portion 64R, as shown in FIGS. 8B and 8C. Because the left half groove 63L is displaced in the direction of arrow De (which is the same as the direction Rf) to come out of phase with the right half grove 63R, the ball 71 is out of contact with the side wall surface portion 64L. At this moment, the side wall surface portion 64L exerts no reaction force on the ball 71. Thus, the ball 71 pushed by the projecting surface 53 is made to roll along the side wall surface portion 64R into the left half groove 63L, as shown in FIG. 8C.

As the motive power of the engine 12 is transmitted to the clutch 50, the cylindrical member 43a continues to rotate. This causes the projecting surface 53 to keep pushing the ball 71 in the direction Rf even after the ball 71 moves into a space between the butting surface 31c and the side wall surface portion 64L, as shown in FIG. 8C. Consequently, the ball 71 pushes only the side wall surface portion 64L in the direction Rf. The left transmission shaft 30 is caused to rotate in the direction Rf with the side wall surface portion 64L pushed by the ball 71.

The right transmission shaft 31 is in contact with the ball 71 only at the butting surface 31c. The side wall surface portion 64R is not pushed by the ball 71. With this arrangement, the right transmission shaft 31 stops rotating.

The left transmission shaft 30 alone rotates to thereby turn the tiller 10 rightward, as shown in FIG. 8A. The tiller 10 can thus be turned in the right direction Mr performing the tilling operation.

The tiller 10 which has turned rightward can be switched into a straight propulsion. This can be accomplished performing any one of the following three methods:

(1) First Method

The grip of the inside turning rod continues to be pushed more strongly than the grip of the outside turning rod. More specifically, the pushing force P3 exerted on the grip 18R of the operational rod 17R is made greater in magnitude than the pushing force P2 exerted on the grip 18L of the operational rod 17L. This causes the right transmission shaft 31 to rotate at a higher speed than the left transmission shaft 30. Therefore, the right half groove 63R is shifted in the direction of the arrow De, so that the right and left half grooves 63R, 63L are in phase again, as shown in FIG. 7B.

As the motive power of the engine 12 is transmitted to the clutch 50, the cylindrical member 43a keeps rotating, as previously described. The motive power of the engine 12 is thus transmitted or distributed substantially evenly to the right and left transmission shafts 31, 30 with the right and left half grooves 63R, 63L positioned in phase. More specifically, with the side wall surface portions 64R, 64L pushed by the balls 71, the right and left transmission shafts 31, 30 are rotated in the direction Rf at substantially the same speed. This enables the tiller 10 to travel straight in the forward direction.

(2) Second Method

The grip of the outside turning rod continues to be pushed more strongly than the grip of the inside turning rod. More specifically, the grip 18L of the operational rod 17L is pushed more strongly than the grip 18R of the operational rod 17R. The left transmission shaft 30 thus rotated relative to the right transmission shaft 31 as shown in FIGS. 8B and 8C is further rotated in the direction of the arrow De so that the left half groove 63L is in phase with the right half groove 63R again, as shown in FIG. 7B. Thereafter, the right and left transmission shafts 31, 30 rotate simultaneously, as stated in the first method. This enables the tiller 10 to travel straight in the forward direction.

(3) Third Method

The grip of the outside turning rod stops being pushed. More specifically, the left grip 18L of the left operational rod 17L stops being pushed. The right transmission shaft 31 has stopped rotating because the balls 71 do not push the side wall surface portions 64R. As a result, the left transmission shaft 30 alone rotates in the direction De so that the left half groove 63L is in phase with the right half groove 63R again, as shown in FIG. 7B. Thereafter, the right and left transmission shafts 31, 30 rotate simultaneously, as stated in the first and second methods. This enables the tiller 10 to travel straight in the forward direction.

In the second method, further pushing the left grip 18L, after the right and left half grooves 63R, 63L comes to be in phase again, causes the left half groove 63L to be displaced again, as shown in FIGS. 8A and 8B. This enables the tiller 10 to keep turning rightward.

For turning the tiller 10 leftward, the right grip 18R of the right operational rod 17R is pushed more strongly than the left grip 18L of the left operational rod 17L. Then, the right transmission shaft 31 operates in the same manner as the left transmission shaft 30 shown in FIGS. 8A and 8B. This enables the tiller 10 to turn leftward. It should be understood that performing any one of the above three methods (1) to (3) enables the leftward turned tiller 10 to travel straight in the forward direction.

As is apparent from the foregoing description, the clutch 50 transmits the motive power of the engine 12 to either one or both of the right and left transmission shafts 31, 30 to turn or propel the tiller 10.

The walk-behind working machine of the present invention includes a wide variety of walk-behind ones such as a snow removing machine or a cart as well as the tiller 10. The drive source may be an electric motor rather than the engine 12. The driving cylindrical member may be of any type other than the hub of the driven bevel gear if only to serve the function of driving the transmission shafts 31, 30 as discussed above.

The present disclosure relates to the subject matter of Japanese Patent Application No. 2002-203219, filed Jul. 11, 2002, the disclosure of which is expressly incorporated herein by reference in its entirety.

What is claimed is:

1. A walk-behind working machine comprising:

a motive power source for producing a motive power;

right and left transmission shafts having outer peripheral surfaces having first grooves formed thereon; and a clutch for transmitting the motive power from said drive source to said right and left transmission shafts;

said right and left transmission shafts each having one end, the ends of said right and left transmission shafts having right and left butting surfaces formed thereat, the right and left butting surfaces butting against each other, such that said right and left transmission shafts are disposed in alignment;

said clutch including:

a cylindrical member rotationally mounted around the ends of said right and left transmission shafts, said cylindrical member having an inner peripheral surface having second grooves formed thereon; and balls each disposed within a space defined by said first groove and said second groove;

said cylindrical member capable of rotating to thereby rotate said right and left transmission shafts by means of said balls;

said first grooves each having a generally V-shaped configuration and being directed in the direction of rotation of said right and left transmission shafts, said first grooves each having a leading end positioned between the right and left butting surfaces, said first grooves of the generally V-shaped configuration each having a bottom surface and a wall surface continuous with the bottom surface, the bottom surface and the wall surface contacting said ball.

* * * * *